United States Patent [19]

Taylor

[11] 4,039,759
[45] Aug. 2, 1977

[54] LINE SECURITY DEVICE
[76] Inventor: James H. Taylor, 409 Redondo Ave., Long Beach, Calif. 90814
[21] Appl. No.: 586,614
[22] Filed: June 13, 1975
[51] Int. Cl.² ............................................. H04M 1/70
[52] U.S. Cl. ..................................... 179/38; 179/17 B; 179/99
[58] Field of Search ........... 179/38, 39, 17 B, 18 AD, 179/18 DA, 19–21, 99; 339/256 SP, 258 S

[56] References Cited
U.S. PATENT DOCUMENTS

| | | | |
|---|---|---|---|
| 2,774,952 | 12/1956 | Batcheller | 339/258 S |
| 3,155,776 | 11/1964 | Kano et al. | 179/17 B |
| 3,499,121 | 3/1970 | McIntosh et al. | 179/17 B |
| 3,514,544 | 5/1970 | Chambers, Jr. | 179/17 B |
| 3,636,505 | 1/1972 | Poltonavage | 339/256 SP |
| 3,725,601 | 4/1973 | Jetzt et al. | 179/38 |
| 3,860,763 | 1/1975 | Sudoh et al. | 179/18 DA |

Primary Examiner—Kathleen H. Claffy
Assistant Examiner—Gerald L. Brigance

[57] ABSTRACT

A line security device adapted for use in a conventional telephone instrument including a Zener diode tied by its cathode to the high, or the Tip, lead within the instrument, the anode of the Zener diode controlling, across a resistor, the base of a first NPN-PNP transistor pair which, in the manner of a silicon controlled rectifier, or SCR, controls the all or nothing conduction of a second composite pair. The controlling base of the first pair is tied across a capacitor to the low, or Ring, lead of the instrument and the emitter of the PNP transistor thereof drives the base of the second composite pair which is in circuit with the high, or Tip, signal lead. The Zener diode is selected to break down on high line signal levels corresponding to the instances when the instrument is off the line, e.g., prior to the closure of the hook switch of the instrument, and will not pass the lower line to turn on the first transistor pair once another instrument is connected across the line. The configuration of the second composite pair thus provides an all or nothing switch in the instrument circuit including at its output regenerative feedback to maintain the first pair latched on. To preclude various noise spikes from appearing at the receiver, the receiver circuit includes a PNP transistor emitter connected and base biased to the Tip lead output of the second composite pair and further controlled at the base by the output of the first pair.

4 Claims, 2 Drawing Figures

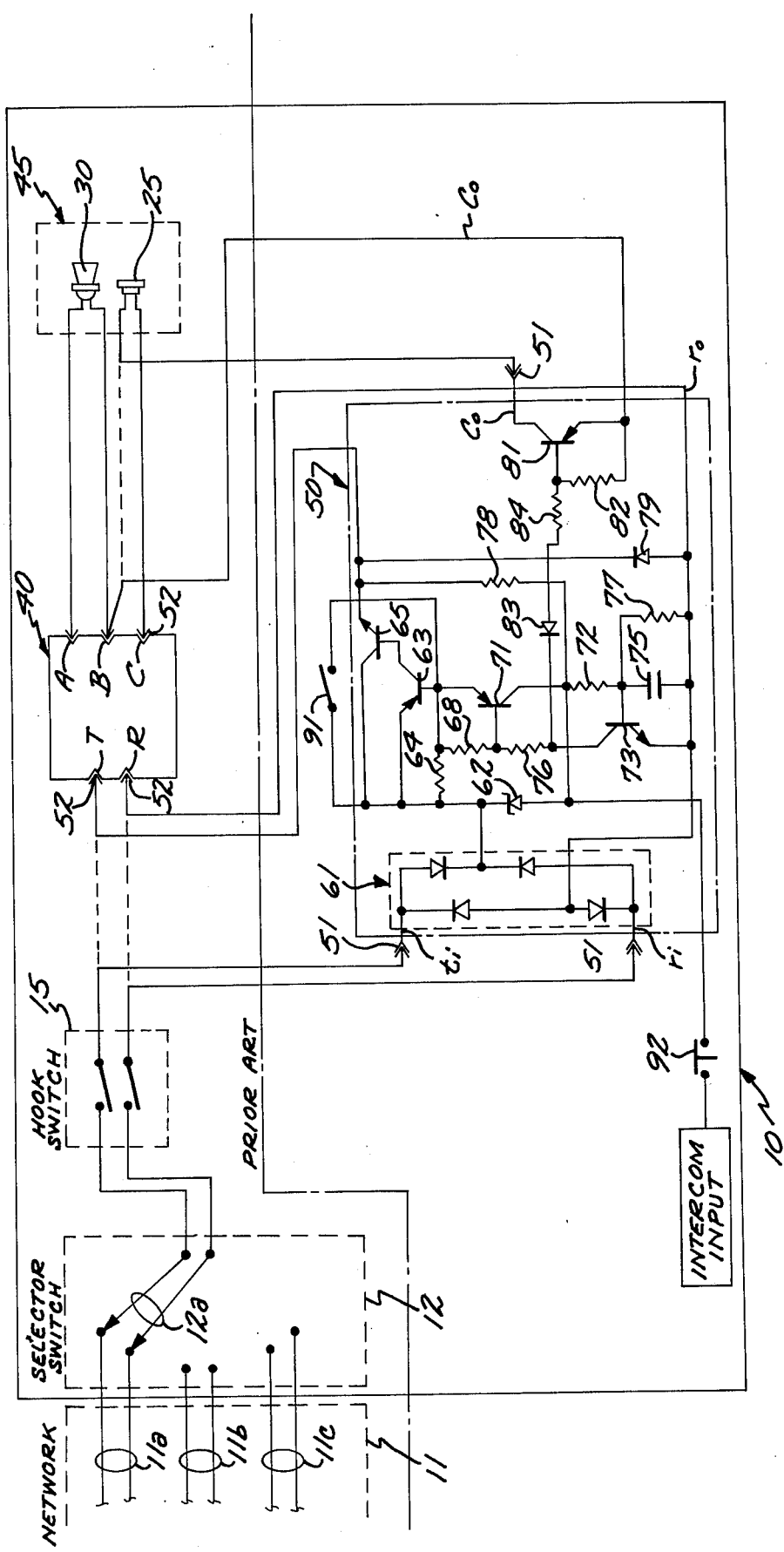
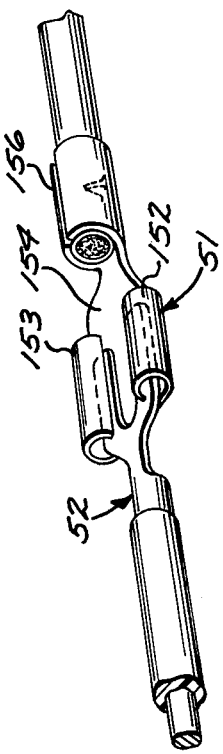
FIG. 1
FIG. 2

LINE SECURITY DEVICE

BACKGROUND OF THE INVENTION

1. Field of the Invention

The present invention relates to telephone security systems, and more particularly to a line isolating system for use in a multi-station customer facility.

2. Description of the Prior Art

In many installations, one telephone line often services a plurality of remotely distributed extension telephones. Where telephone use is heavy, more than one telephone line may service the installation, all lines being distributed to each extension telephone or station where they can be easily reached. Thus each telephone can be selectively tied to any one line and therefore discussions occurring on one station can be overheard at other stations. In this manner, sensitive or private communications are easily discovered and for that reason security devices which selectively exclude other stations are often desired. Most prior art devices directed at this purpose required connections in front of the instrument or station, or into the line, and if any one station was to be secured, a security device was required for each line servicing that station.

Furthermore, most of the prior art devices, by virtue of their connections to the individual telephone lines do not allow convenient disconnecting and if privacy or security is to be traded off in favor of a conference connection, a cumbersome removal procesure is required.

In addition, most such prior art devices require an external power source.

SUMMARY OF THE INVENTION

Accordingly, it is the general purpose and object of the present invention to provide a telephone security device particularly adapted for a multi-line serviced telephone instrument wherein a single such device services all of the lines connected to one instrument.

Other objects of the invention are to provide a security device which draws minimal power and can therefore be directly powered by the telephone line.

Further objects of the invention are to provide a security device which is simple to connect and can be furthermore selectively disconnected.

Briefly, the present invention is adapted for use in a conventional telephone instrument, taking benefit of some of the features thereof, and is therefore dependent on its functioning thereon. Accordingly, general reference to a typical telephone instrument is included herein in conjunction with the summary of the inventive system.

In a typical telephone instrument, a line comprising two leads is connected from the central office across the hookswitch supporting the handset. While the telephone is inoperative, the handset is on the hook and the hookswitch is maintained open. The only circuit connected to the line during such times is the ringer circuit which is conventionally arranged across the line leads ahead of the hookswitch, and is excited by signals originating from the central office. Included behind the hookswitch, within the instrument, are the dial switches or tone generators, the side tone circuit and the transmitter and receiver in the handset.

Where more than one line services the instrument, such instrument is commonly referred to as a station.

In a typical telephone station, the plurality of lines are selectively connected by a selector switch, usually in the form of a plurality of push buttons located in front of the hookswitch, tying a single line operating the instrument to any one of the lines selected from the central office. Since a plurality of separate lines are thus available to the station, more than one station is usually connected to the same trunk and therefore plural stations can be selectively tied to the same line. Thus a user of any one station can select any line, including those lines which are concurrently in use by other stations. In this manner, access can be easily achieved to any conversation and very often matters intended to be confidential are thus discovered. The operation of each line once connected, however, is typically conventional with the associated signal changes before and after the line is acquired for conversation.

Such signal level changes occur as result of circuit completion between the central office and the local instruments. Specifically, in a conventional telephone network the power supply is provided at the central office and before the closure of the instrument hookswitch a higher potential exists on the line. When an instrument is connected across the line the network is loaded by the low impedance in the instrument and the line potential drops. Because of line induction, the dropping transient, or the trailing edge, will appear behind the hookswitch after the closure thereof.

The present invention takes benefit of this change in potential by connecting behind the hookswitch of the instrument a Zener diode having a breakdown level between the above described high and low line potentials. To protect against inadvertent polarity reversals, a diode bridge is interposed between the hookswitch and the Zener diode. Thus the Zener diode is connected by its cathode to the positive side of the bridge output, connecting at its anode across a resistor to the base of an NPN transistor which by its collector drives the base of a PNP transistor, connected as two complementary transistors in a regenerative feedback circuit. This transistor pair, hereinafter referred to as the first transistor pair, includes an R-C network at its gating base and in turn drives the base of yet another PNP transistor driving the base of an NPN transistor in circuit with the positive bridge output. The latter combination of transistors, referred to as the second pair, thus completes the circuit including the transmitter and the receiver of the instrument to the return side of the bridge.

The receiver circuit is further controlled by a PNP transistor connected at its base to the collector of the NPN transistor of the first pair.

In addition to the above connections, a latching feedback is provided between the output of the second pair and the gating base of the first pair which will unlatch only after the hookswitch is opened.

BRIEF DESCRIPTION OF THE DRAWINGS

FIG. 1 is a circuit diagram of a prior art telephone instrument modified to include a circuit constructed according to the present invention; and FIG. 2 is a perspective view of an inventive receptacle adapted for use with the present invention.

DESCRIPTION OF THE SPECIFIC EMBODIMENT

As shown in FIG. 1, a telephone instrument, generally designated by the numeral 10, is tied to a telephone communication network 11 across a selector switch 12.

Network 11 is shown by way of three dual lead, or paired, lines 11a, 11b, and 11c, where line 11a is selected by switch contacts 12a of the selector switch 12. Contacts 12a then connect to a hookswitch 15 which prior to the inventive improvement typically connected directly to the Tip and Ring terminals of a telephone circuit, shown herein as terminals T and R, on circuit 40. On the other side of circuit 40, a conventional receiver 25 and transmitter 30 are shown disposed within a handset 45, transmitter 30 connecting between terminals A and B thereon, while receiver 25 is connected across a terminal C and the terminal B. Thus the transmitter 30 and receiver 25 are conventionally tied to one common terminal B, the other ends thereof being connected to the opposite ends of the typical anti-sidetone section of the prior art telephone circuit 40.

Generally, the connections at terminals T, R, A, B and C are all spade lug connections and the removal thereof is therefore conventional. The present inventive circuit, shown herein by the numeral 50, takes benefit of the above spade lug means of connection by providing leads $t_i$, $r_i$, $t_o$, $r_o$, $r_c$, $c_i$ and $c_o$, leads $t_i$, $r_i$ and $c_o$ each terminating in an inventive spade lug receptacle 51 while leads $t_o$, $r_o$ and $c_i$ terminate in spade lugs 52. Thus leads $t_i$ and $r_i$ are adapted to receive the Tip and Ring leads from hookswitch 15, rerouting such leads from the original connection thereof shown in dotted line. Similarly, lead $c_i$ is adapted to receive the receiver line originally tied to terminal B, the original connection thereof being again shown in dotted line. Leads $c_o$, $t_o$ and $r_o$ then provide the replacement spade lug connections at terminals C, T and R, respectively.

Within the inventive circuit 50, leads $t_i$ and $r_i$ tie to the input terminals of a diode bridge 61. The positive output of bridge 61 is tied to the cathode of a Zener diode 62 and to the emitter of a PNP transistor 63. The base of transistor 63 is similarly tied to the cathode of diode 62 across a resistor 64. The collector of transistor 63 in turn drives the base of an NPN transistor 65 connected by its collector to the emitter of transistor 63. Transistors 63 and 65 thus form a compound transistor circuit which renders transistor 65 conductive when the base of transistor 63 is pulled down. The base of transistor 63 connects to yet another compound transistor circuit, tying to the emitter of a PNP transistor 71 and to the base thereof across a resistor 68. Transistor 71 connects by its collector to the anode of Zener diode 62. The collector of transistor 71 furthermore ties across a resistor 72 to the base of an NPN transistor 73, transistor 73 providing a positive feedback by way of a collector connection, across a resistor 76, back to the base of transistors 71. The emitter of transistor 73 connects to the bridge return and the base is similarly connected across an R-C network comprising a capacitor 75 in parallel with a resistor 77. The circuit including transistors 71 and 73 thus provides positive base-collector feedbacks and will therefore latch into a conductive state when pulsed by a signal from the anode of Zener diode 62.

Thus, if the breakdown level of Zener diode 62 is below the open circuit voltage and above the closed circuit voltage of the telephone network, the hookswitch transient will be passed thereacross to latch the combination of transistors 71 and 73. When so latched, the emitter of transistor 71 turns transistor 65 on, which in turn is tied by the emitter thereof to the T terminal of circuit 40.

This latching action is aided by a resistor 78 tied between the emitter of transistor 65 and the collector of transistor 71 prevent a partial turn-on of the circuit. Thus once transistor 65 is turned on, it will stay on until all power is removed, or until the hookswitch 15 is opened.

Transistor 65 is, however, initially rendered conductive by the pulse passed by Zener diode 62 which will occur only if the line voltage thereacross is above its breakdown level. Zener diode 62 is selected to break over at approximately 18 volts which is above the 10–14 volt levels appearing across the line during conversation levels.

Typically, before the hookswitch is closed or the instrument is on the line, only the line load is connected across any signal sources at the central office. The telephone line is conventionally powered at the telephone central office by a current source equivalent which with the line open will reach 21–56 volt levels. When the instrument is connected to the line, or when the hookswitch is closed, the load of the instrument brings the line voltage down to approximately 10–14 volts, which is then audio-modulated to carry the speech signals. Because of line induction, a high-to-low pulse transition occurs within each instrument immediately after the hookswitch closure.

Thus, the inventive circuit is rendered operative both at the calling and the called instrument by the high-to-low transition appearing in each instrument. Any other instrument equipped with the invention device tying to the line subsequent thereto will be tying to a line already below the Zener breakdown levels and therefore will not transmit conversation unless intentionally controlled by means further described.

To conform to previous nomenclature, transistors 71 and 73 form the first compound transistor pair, and because of the circuit configuration thereof forming the regenerative feedback, the first transistor pair operates as a gated switch. Transistors 63 and 65 form the second transistor pair. The configuration of the circuit of the second pair, however, conforms to that of a composite transistor having an alpha much greater than 1 to therefore provide an all or nothing switching action.

The output of the second pair, or the emitter terminal of transistor 65, is a reverse biased protection diode 79 which shorts any negative transients from the network.

In addition to the above elements, the inventive circuit 50 includes a PNP transistor 81 connected at its emitter to the terminal C and by its collector to the high side of receiver 25. Transitor 81 furthermore includes a base-emitter resistor 82 and is also connected at its base to the collector of transistor 73 across a diode 83 in series with a resistor 84. In this manner, unwanted spikes from the receiver circuit are suppressed.

An override function is included whereby a master instrument may selectively override the operation of any remotely located instrument controlled by the circuit 50 to thereby permit selective conference connections. This override function is accomplished by a switch 91 connected across resistor 64. Similarly, the anode of Zener diode 62 is tied to the intercom selector circuit of the instrument, shown as switch 92, whereby the base of transistor 73 may be selectively gated after a call is completed. Thus any instrument can be selectively brought in by the closure of switch 91 or the intercom switch 92, allowing for selective conferencing or instrument switching by any user station so provided.

As shown in FIG. 2, receptacle 51 includes two rolled over edges 152 and 153 extending from the distal sides of a central plate 154, the free ends of edges 152 and 153 being directed in opposition to the interior surface of plate 154. Plate 154 extends beyond the longitudinal dimensions of edges 152 and 153 to form an insulation piercing clip 156 for engaging the wire. Inserted within the gap between edges 152 and 153 and the plate 154 is the spade lug 52. Thus a spade lug may be conveniently connected to leads $t_i, r_i$ and $c_o$ to form the desired connection.

Obviously, many modifications and variations of the present invention may be made with regard to the foregoing detailed description without departing from the spirit of the invention.

What is claimed is:

1. A line security device adapted for connecting across the line communicating with a telephone instrument of the type that includes a receiver connected across said line, comprising:

level sensing means connected to one side of said line for producing an output signal when said line is excited by an electrical potential above a predetermined level;

latching means connected to receive said output signal for switching into a conductive state upon receipt thereof;

transistor switching means connected in circuit between said receiver and the one side of said line and controlled by said latching means to be rendered conductive after said latching means is conducting; and remote connecting means connected to said switching means and said level sensing means for selectively rendering said switching means conductive.

2. A device according to claim 1, wherein:
    said switching means includes a composite circuit comprising a PNP and an NPN transistor; and
    said latching means each includes a PNP and an NPN transistor connected in regenerative feedback.

3. A device according to claim 2, further comprising:
    a capacitor connected between the base of said NPN transistor of said latching means and the other side of said line.

4. A device according to claim 3, wherein:
    said instrument includes spade lug connections; and
    said circuit includes spade lug receptacles adapted to receive said spade lug connectors.

* * * * *